United States Patent
Tang (12) United States Patent (10) Patent No.: US 8,220,930 B2
Tang (45) Date of Patent: Jul. 17, 2012

(54) INTEGRATED OPTO-ELECTRONIC DEVICE AND PORTABLE REFLECTIVE PROJECTION SYSTEM

(75) Inventor: Deming Tang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 507 days.

(21) Appl. No.: 12/411,308

(22) Filed: Mar. 25, 2009

(65) Prior Publication Data
US 2009/0244488 A1 Oct. 1, 2009

Related U.S. Application Data

(60) Provisional application No. 61/039,291, filed on Mar. 25, 2008.

(51) Int. Cl.
- *G03B 21/14* (2006.01)
- *H01J 40/14* (2006.01)
- *G02F 1/01* (2006.01)
- *H01L 31/00* (2006.01)

(52) U.S. Cl. ............... 353/20; 250/225; 136/256

(58) Field of Classification Search ............... 353/20, 353/97, 122, 85; 250/225, 215; 136/256; 257/461; 359/485.03, 489.01, 485.04, 566
See application file for complete search history.

(56) References Cited

U.S. PATENT DOCUMENTS

| | | | |
|---|---|---|---|
| 5,552,922 A | 9/1996 | Magarill | |
| 5,604,624 A | 2/1997 | Magarill | |
| 6,423,980 B1 * | 7/2002 | Wilson et al. | 257/21 |
| 6,461,000 B1 | 10/2002 | Magarill | |
| 6,490,087 B1 | 12/2002 | Fulkerson et al. | |
| 6,818,959 B2 | 11/2004 | Montelius et al. | 257/415 |
| 6,858,462 B2 * | 2/2005 | Zaidi et al. | 438/71 |
| 6,970,213 B2 | 11/2005 | Kawahara et al. | |
| 7,158,302 B2 | 1/2007 | Chiu et al. | |
| 2008/0012805 A1 | 1/2008 | Duncan et al. | 345/84 |

(Continued)

FOREIGN PATENT DOCUMENTS

EP 1061405 12/2000
WO WO 2008018551 A1 * 2/2008

OTHER PUBLICATIONS

Application Note 484, "Harnessing Solar Power with Smart Power-Conversion Techniques" Maxim Innovation Delivered, http://www.maxim-ic.com/app-notes/index.mvp/id/484.

(Continued)

*Primary Examiner* — William C. Dowling
*Assistant Examiner* — Ryan Howard
(74) *Attorney, Agent, or Firm* — J.C. Patents (57) ABSTRACT

An integrated opto-electronic device, a portable reflective projection system and a method for in situ monitoring and adjusting light illumination are provided. The device includes a reflective polarizing composite film (150) configured to receive a source light (210) at a desired non-normal incident angle (221), polarizes and reflects a first portion (211) of said source light (210) as polarized illumination light (16) at a reciprocal angle (222) to said desired non-normal incident angle (221); and a photovoltaic cell (180), adhered to an opposite side of said reflective polarizing composite film (150) to said source light (210), configured to receive a second portion (212) of said source light (210) that passes through said reflective polarizing composite film (150) and transform said second portion (212) to photogenerated charge. Unused illumination can be collected in order to re-store and reuse recovered energy.

19 Claims, 7 Drawing Sheets

U.S. PATENT DOCUMENTS

2008/0100914 A1* 5/2008 Suganuma .................... 359/488
2009/0173373 A1* 7/2009 Walukiewicz et al. ........ 136/244
2010/0053572 A1* 3/2010 Oka et al. ...................... 353/100

OTHER PUBLICATIONS

Zhaoning Yu et al., "Reflective polarizer based on a stacked double-layer subwavelength metal grating structure fabricated using nanoimprint lithography" Applied Physics Letters, Aug. 14, 2000, vol. 77, No. 7, pp. 927-929.

"Vikuiti Diffuse Reflective Polarizer Film (DRPF)—A new enhancement film for large viewing requirement" 3M Innovation product brochure, http://multimedia.3m.com/mws/mediawebserver?mwsId=SSSSSu7zK1fs1xtU48_vO82Zev7qel7zHvTSevTSeSSSSSS--&fn=DRPFss.pdf.

* cited by examiner

INTEGRATED OPTO-ELECTRONIC DEVICE AND PORTABLE REFLECTIVE PROJECTION SYSTEM

CROSS-REFERENCE TO RELATED APPLICATIONS

This application claims priority of provisional application No. 61/039,291, filed on Mar. 25, 2008, entitled "A Solid State Reflective Polarizer with Photovoltaic Cell Backplane and Its Uses in Portable Projection System", which is incorporated herein by reference in its entirety.

FIELD OF THE INVENTION

The present invention relates to a image projecting field, particularly to an integrated opto-electronic device and a portable reflective projection system.

BACKGROUND

A variety of optical-electrical systems exist for projecting images or information on a display screen sized tens to hundreds of inches, from a microdisplay imager in a size of sub inch. Such a microdisplay imager consists of a planar array of light modulation micro-scale pixels fabricated on a silicon substrate. The optical reflectance of each pixel is electrically modulated in situ by an underlying CMOS-based circuitry fabricated on the same silicon substrate. Most common of such reflective microdisplay imagers are liquid crystal on silicon (LCOS), deformable mirror device (DMD) and galvanic light valve (GLV).

A variety of optical engine and projection lens assembles are employed and assembled, for adequately inducing light ray to such a reflective microdisplay imager and then optically projecting the image formed in differentiated gray scales of reflected light on the microdisplay imager to a display screen. Such an optical system, often called optical engine assembly, at least consists of a light source, a reflective microdisplay imager, a projection lens (or lens), and last but not least, an optical device, often called engine core, inducing the illumination light from the light source to the reflective microdisplay imager, in which a reflective microdisplay imager and the projection lens are mounted in parallel on the opposite sides of the engine core. Fixed in a tilted angle with the microdisplay imager and projection lens, the engine core consists of at least one optical surface, receiving and deflecting portion of illumination light from the light source towards the microdisplay imager. Portion of spatially modulated light reflected from the source light by the imager passes through the engine core and the projection lens and thus, is projected on a display screen forming an enlarged image. Prior art shown in the patents, such as U.S. Pat. No. 5,552,922, U.S. Pat. No. 5,604,624, U.S. Pat. No. 6,461,000, U.S. Pat. No. 6,490,087, EP 2000/0830425, and US 20080012805, by Magarill, Lambertini and Duncan well exemplifies the basic optical framework of such an optical engine assembly and projection system. More sophisticated projection systems employ an engine core combining two or more of such optical surfaces in crossing configuration for inducing light to multiple microdisplay imagers and constructing the images of different color or light spectrums to a single projection display.

Such a projection system is miniaturized to a "micro" or "pico" system, with both optical engine and imager shrunk proportionally, for various portable and mobile handheld applications. In such applications, power consumption of a micro or pico projection system is often of serious concern.

Meanwhile, optical efficiency of such a projection system is far from 100% and so is the net energy efficiency from electrically powered light source to projection illumination out of projection lens. Diffraction and deflection away from the main illumination beam paths by various surfaces, as well as light scattering by transparent medium, such as air, in such a projection system are among the main causes to such loss in optical efficiency and thus electrical energy. It is highly desirable to collect and convert such unused illumination in order to recover part, if not most of energy loss, preferably in situ within the projection system and to re-store it into a built-in energy storage device, particularly into a rechargeable battery, and to reuse recovered energy for partially powering the light source and/or microdisplay imager, as well as other electrically powered devices in such a handheld device.

As photovoltaic device technology advances, more than 20% of photonic-electrical energy conversion efficiency could be achieved. Such micro or pico projection systems often require illumination in a fairly high intensity from its light source, but the overall optical efficiency is in low percentages. Loss due to light reflection and deflection by various surfaces as well as light scattering by transparent material enclosed in their optical system contributes substantially to efficiency reduction. Thus, potential and need for recovering such energy loss due to unavoidable optical artifacts and converting portion of unused illumination to reusable photo-generated charge is considerable for extending service time of the built-in rechargeable battery.

Figure 1:
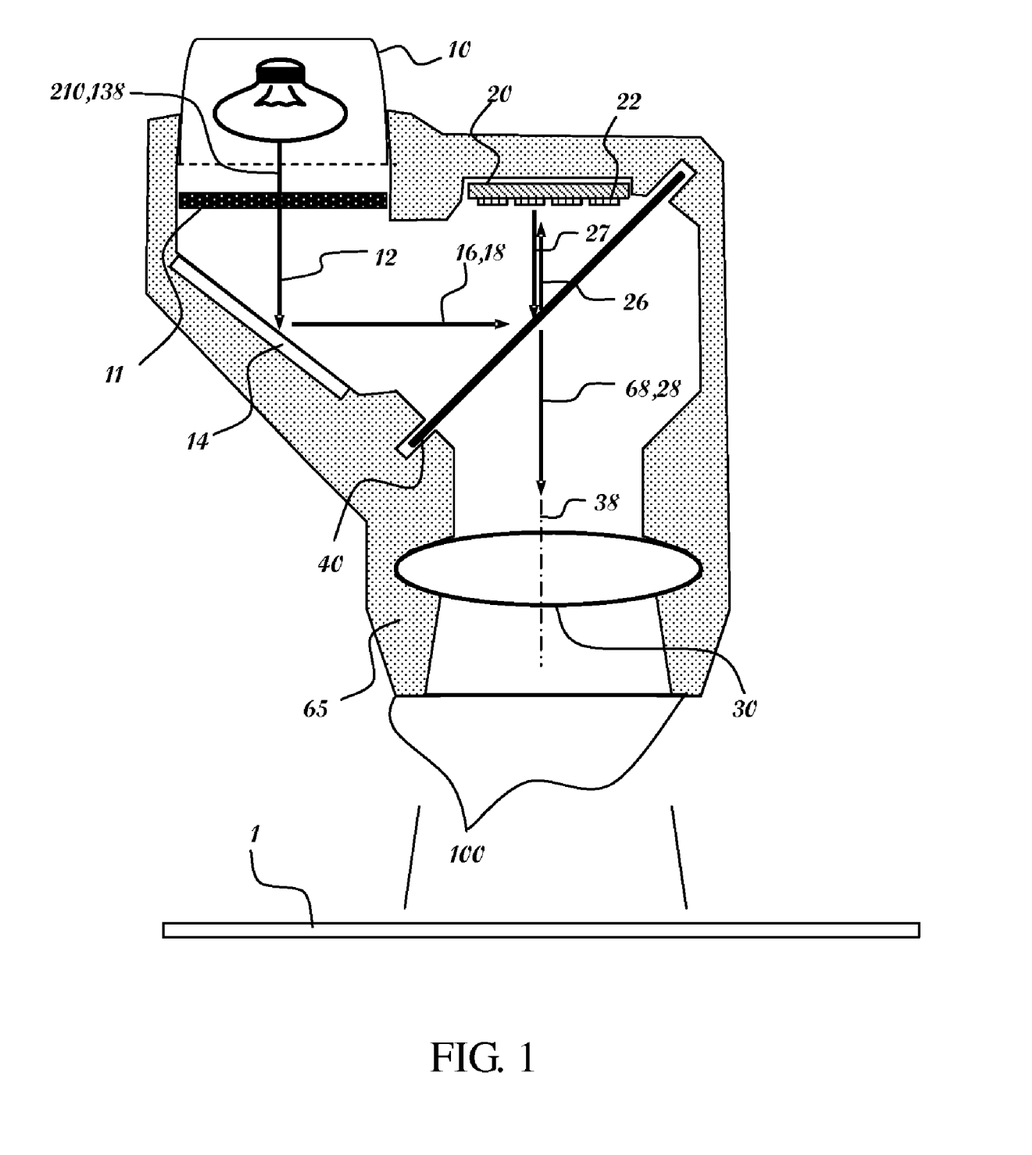
FIG. 1 shows the overall construction of a conventional portable reflective projection system in prior art, using a transmissive polarizing film 11 and a light-redirecting mirror 14 for inducing polarized illumination light 16 eventually to a reflective microdisplay imager 20 by the means of modulation of polarized illumination.
Figure 2:
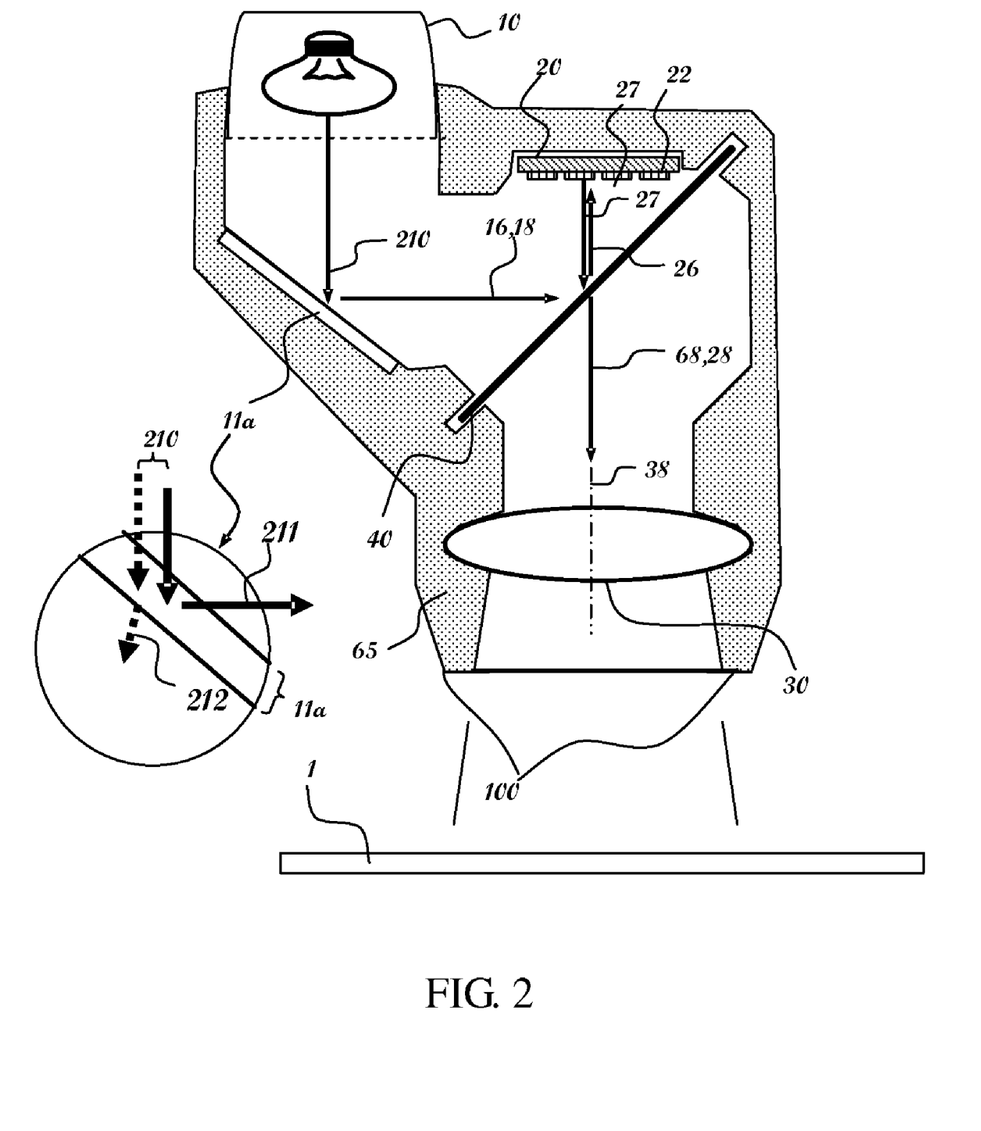
FIG. 2 shows the overall construction of another conventional portable reflective projection system in prior art, using a reflective polarizing film 11a for inducing polarized illumination light 16 eventually to a reflective microdisplay imager 20.

However, in a portable reflective projection system employing a single-panel LCOS imager as a the reflective microdisplay imager 20 and a simple optical engine as shown in FIG. 1, considerable loss in optical efficiency still results from polarization of illumination light by a transmissive polarizing film 11 providing polarized source light 12 towards a light-redirecting mirror 14. Second, a low cost transmissive polarizing film 11 is often made of polymeric materials so that its thermal stability and radiation aging are of concern under various adverse application environments. Further advance of the prior art from the system shown in FIG. 1 is made by employing a reflective transmissive polarizing film 11a, replacing both the transmissive polarizing film 11 and the light-redirecting mirror 14, as shown in FIG. 2. Even though majority of the P-component of incident light is reflected for illumination eventually to the LCOS imager, the S-component is deflected and absorbed as waste energy by the reflective polarizing film 11a. It is highly desired that such loss of energy could be partially recovered while the optical engine system is configured to have sufficient temperature stability and mechanical compactness at low cost without additional components. Such reflective polarizing film or panel can be fabricated as shown in U.S. Pat. No. 7,158,302 by Yu et al, or U.S. Pat. No. 6,970,213 by Kawahara, et al.

SUMMARY

The subject of the present invention is to provide an integrated opto-electronic device and a portable reflective projection system.

An embodiment of the present invention provides an opto-electronic device which may be in a plannar configuration. The opto-electronic device comprises a reflective polarizing composite film configured to receive a source light at a desired non-normal incident angle, polarize and reflect a first portion of the source light as polarized illumination light at a reciprocal angle to the desired non-normal incident angle; and a photovoltaic cell 180 which may be a plannar photovoltaic cell, adhered to an opposite side of the reflective polarizing composite film to the source light, configured to receive a second portion of the source light that passes through the reflective polarizing composite film and transform the second portion to photogenerated charge.

Another embodiment of the present invention further provides a portable reflective projection system comprising:
  an electrically powered light source configured to provide a source light in a first direction;
  an integrated opto-electronic device of the present invention;
  a reflective microdisplay imager comprising a plurality of reflective pixel elements which are arranged in a common plane, wherein the reflective pixel elements are configured to individually modulate reflectivity to incident polarized light and project spatially modulated light in a third direction perpendicular to the common plane;
  a lens having a principal plane parallel to the common plane and a principal axis aligned in the third direction;
  an optical surface positioned between the lens and the reflective microdisplay imager and further positioned in a tilted angle with the common plane configured to receive the polarized illumination light, so that a portion of the polarized illumination light is deflected by the optical surface as the incident polarized light towards the reflective microdisplay imager, a portion of the spatially modulated light passes through the optical surface as projection light partially passes through the lens in the third direction;
  a power management device;
  an energy storage device configured to provide electrical power to one or both of the light source and the reflective microdisplay imager through the power management device; and
  a voltage converter and battery charger configure to convert and charge the photogenerated charge transformed by the photovoltaic cell to the energy storage device.

Another embodiment of the present invention further provides a method for in situ monitoring and adjusting light illumination from a light source in a portable reflective projection system of the present invention. The method comprises:
  measuring accumulated photogenerated charge converted from a second portion of a source light collected by a photovoltaic cell over defined time duration of an integrated opto-electronic device; and
  in situ monitoring and adjusting the light illumination from the light source according to a measurement result.

Specifically, the opto-electronic device according to one embodiment of the present invention can provide three optical and optical-electronic functions: 1 receiving source light from a light source in the first direction and polarizing a first portion of the received source light; 2 redirecting or reflecting such polarized illumination light towards an optical surface in a second direction; and 3 receiving a second portion of the received source light into its photovoltaic cell and transforming such second portion to photogenerated charge.

Replacing both the transmissive polarizing filming and the light-redirecting mirror in prior art, the novel opto-electronic device of the present invention not only simplifies a portable reflective projection system but also provides an effective measure to recover portion of the unused optical energy and thus improves the overall energy efficiency of such a portable reflective projection system.

Preferably the photovoltaic cell of the disclosed novel opto-electronic device may be first fabricated on a semiconductor substrate, such as single crystalline or polycrystalline silicon. The photovoltaic cell may comprise a backside electrical contact, a photon-to-electron converting photo diode and a top contact grid in an adherent plannar configuration and spatial stacking sequence. The reflective polarizing film may be later fabricated seamlessly adherent to the top surface of the photovoltaic cell, preferably also through semiconductor fabrication methods.

In one embodiment of the present invention, the reflective polarizing film may comprise one or more of optical layer pairs each made of a top layer and a bottom layer. The top layer first receives the source light having higher refractive index (n) and the bottom layer having lower refractive index (n). Both top layer and bottom layer may be made of dielectric material, such as one or any combination of silicon dioxide, silicon oxy-nitride, silicon nitride, aluminum oxide, hafnium oxide, tantalum oxide and titanium oxide with extinctive coefficients (k) below 0.1 over the desired spectrum of visible light with the wavelength from 400 nm to 700 nm.

Such optical layer pair receives incident source light in a desired non-normal incident angle, polarizes and reflects a first portion of the P-component of the source light as polarized illumination light in a desired reciprocal angle, to be re-directed to illuminate a reflective microdisplay imager. Meanwhile, a second portion, particularly majority of the S-component of source light, is deflected into the photovoltaic cell and thus partially converted by a photo-diode to photogenerated charge. Such photogenerated charge may be electrically drained out through a top contact grid externally to an energy storage device, managed by a voltage converter and battery charger. The opto-electrical energy thus received and restored into the energy storage device (rechargeable battery) may be reused for powering any electronic or opto-electrical component, including the reflective microdisplay imager, the voltage converter and battery charger and even the light source in a portable reflective projection system.

BRIEF DESCRIPTION OF THE DRAWINGS

FIG. 4b is a cross-section view of FIG. 4a;

FIG. 5b is a cross-section view of FIG. 5a;

FIG. 6b is a cross-section view of FIG. 6a;

DETAILED DESCRIPTION

The present invention is described in detail below through embodiments accompanied with drawings.

FIG. 1 shows the overall construction of a reflective microdisplay projection system in one prior art, using a transmissive polarizing film 11 and a light-redirecting mirror 14 for inducing polarized illumination light 16 eventually to a reflective microdisplay imager 20 using polarized modulation. As shown in FIG. 1, source light 210 provided by an electrically powered light source 10 first confronts the transmissive polarizing film 11, which blocks all the S-component and allows only portion of the P-component of the source light 210, or polarized portion, passes through as the polarized source light 12 still in the first direction 138. A light-redirecting mirror 14 receives and reflects the polarized source light 12 as the polarized illumination light 16 in the second direction 18. An optical surface 40 then receives and reflects portion of the polarized illumination light 16, as the incident polarized light 26 illuminating a reflective microdisplay imager 20 in the third direction 28. The incident polarized light 26 is modulated spatially and timely in light intensity and reflected at each of the reflective pixel elements 22 on the reflective microdisplay imager 20 back forth in the third direction 28 as the spatially modulated light 27. Portion of the spatially modulated light 27 then partially passes through the optical surface 40 as the projection light 68 towards a lens 30, with the principal axis 38 of the lens 30 aligned parallel to the third direction 28. The projection light 68 passes through the lens 30 and as a magnified image 100 originally generated by the reflective microdisplay imager 20, is eventually projected onto the projection display screen 1 outside the projection engine chassis 65 on which all those components are assembled and mounted.

FIG. 2 shows the overall construction of a reflective microdisplay projection system in another prior art, using a reflective polarizing film 11a for inducing the polarized light illumination eventually to the modulation microdisplay imager 20, as one improvement and simplification of the first prior art shown in FIG. 1. The reflective polarizing film 11a receives the source light 210 and reflects only first portion 211 of the P-component of the source light 210 as the polarized illumination light 16, eventually redirected towards the reflective microdisplay imager 20 by the optical surface 40. However, the rest or second portion 212 of the source light 210 incident to the reflective polarizing film 11a is not used and thus wasted.

Figure 3:
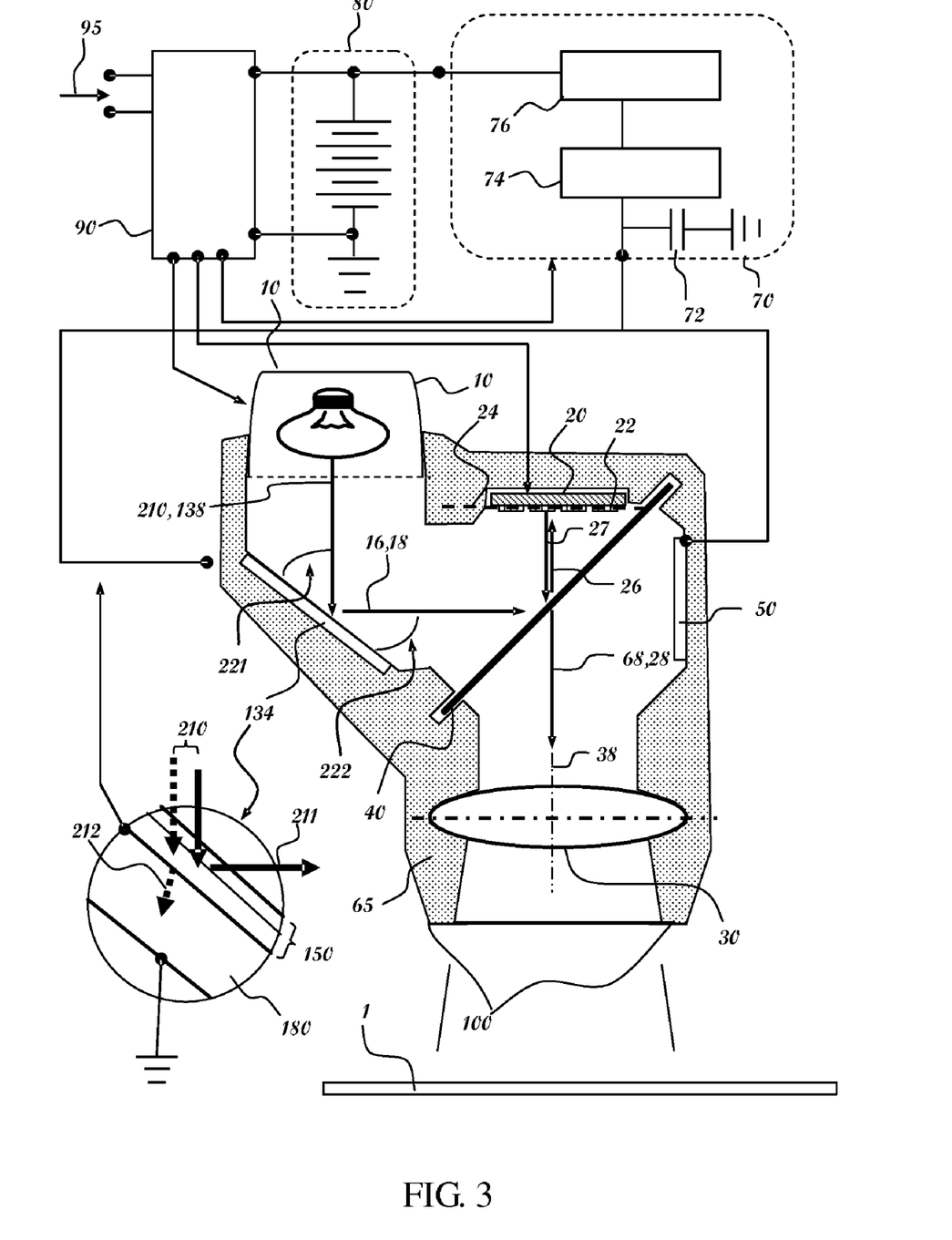
FIG. 3 shows the schematic of one embodiment of the portable reflective projection system with an integrated opto-electronic device incorporated in accordance with one embodiment of the present invention.
Figure 4A:
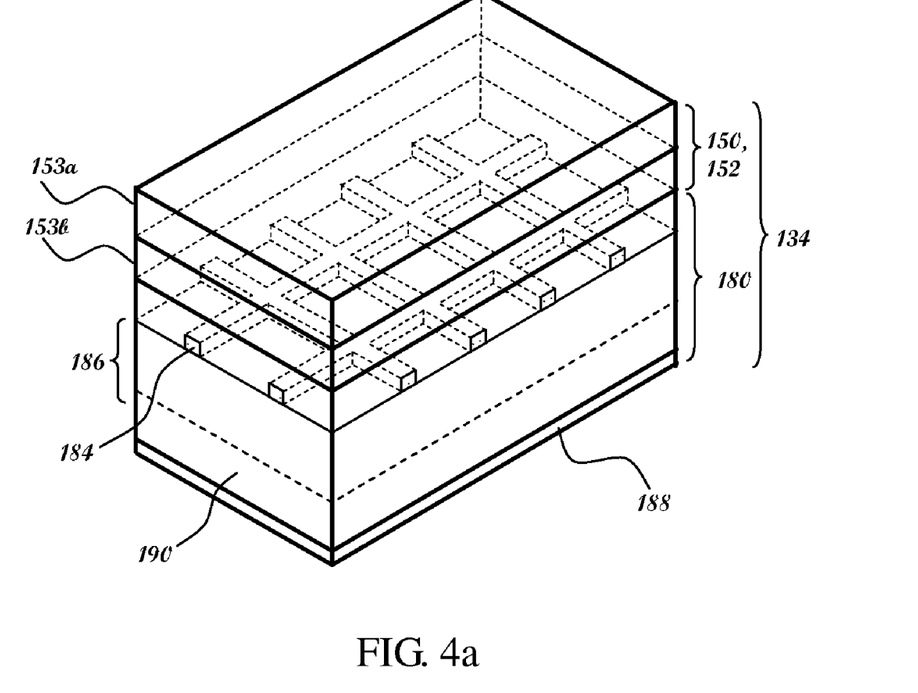
FIG. 4a is a perspective view showing an integrated opto-electronic device in accordance with one embodiment of the present invention, in which the reflective polarizing composite film 150 is adhered on the top of a photovoltaic cell 180 in a plannar stacking configuration.
Figure 4B:
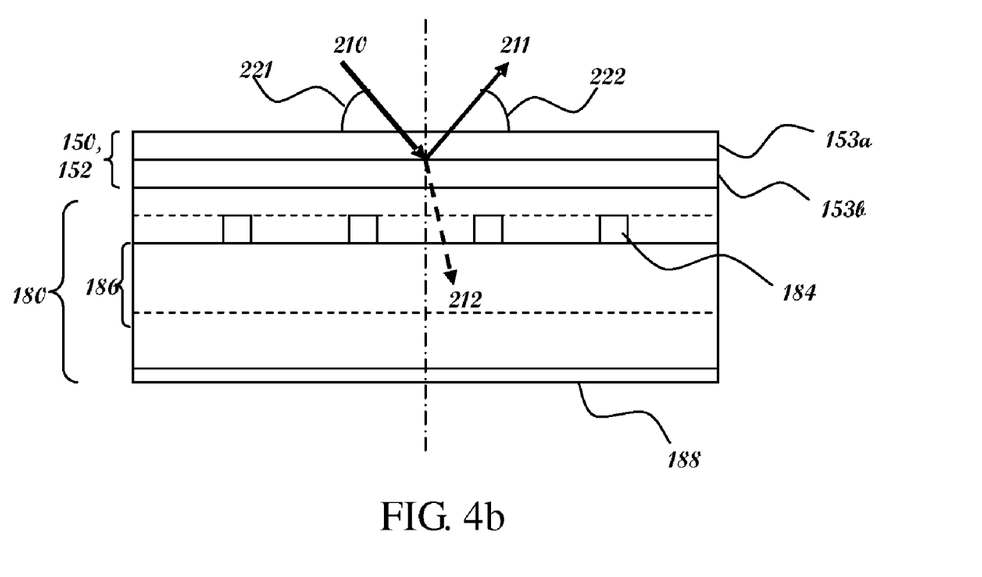

FIG. 3 shows the schematic of one embodiment of the portable reflective projection system with a disclosed novel integrated opto-electronic device 134 incorporated in accordance with the present invention. The integrated opto-electronic device 134 comprises a reflective polarizing composite film 150 and a photovoltaic cell 180, adherently stacked in a plannar configuration. The reflective polarizing composite film 150 may entirely or partially cover the photovoltaic cell 180, and the photovoltaic cell 180 may entirely or partially cover the reflective polarizing composite film 150. The reflective polarizing composite film 150 can be directly placed on the photovoltaic cell 180, or there can be one or more layers, such as a transparent layer, between the reflective polarizing composite film 150 and the photovoltaic cell 180, The reflective polarizing composite film 150 receives incident light, in particular, the source light 210, at a desired non-normal incident angle 221, and reflects only a portion 211 of the P-component of the received source light 210 at the reciprocal angle 222 to the desired non-normal incident angle 221. The rest or the second portion 212, including the S-portion, of the received incident light (the source light 210) is deflected into and received by the photovoltaic cell 180. Illuminated by the received second portion 212, the photo diode 186 photogenerates electron-hole pairs, in which photogenerated electrons are extracted as photogenerated charge (by the top electrical contact grid 184 and photogenerated holes by the backside electrical contact 188, as shown in FIGS. 4a and 4b). Such photogenerated charges can be restored as electrical energy in an energy storage device 80 such as a rechargeable battery though an appropriate electrical circuitry setting shown in FIG. 3 as applied to a reflective microdisplay projection system.

FIG. 4a is a perspective view showing one embodiment of the disclosed novel integrated opto-electronic device 134 in accordance with the present invention, in which the reflective polarizing composite film 150 is adhered on the top of a photovoltaic cell 180 in a plannar stacking configuration and FIG. 4b is a cross-section view of FIG. 4a. Replacing the reflective polarizing film 11a in the reflective microdisplay projection system shown in FIG. 2 by the novel integrated opto-electronic device 134, only portion of the P-component of the source light 210 is reflected as the polarized illumination light 16 eventually for illuminating the reflective microdisplay imager 20, while unused light not reflected but deflected by the reflective polarizing composite film 150 enters and illuminates the underneath photovoltaic cell 180.

In one embodiment of the disclosed invention, the reflective polarizing composite film 150 comprises a single or a plurality of optical layer pairs 152 made of two layers of dielectric material such as rubber. Within the optical layer pair 152, the top layer 153a first receiving the source light 210 has relatively higher optical refractive index than the bottom layer 153b, and the top layer 153a and bottom layer 153b have relatively low optical extinctive coefficients, preferably less than 0.1, to effectively reflect majority of the P-component of the source light 210 at the desired non-normal incident angle 221.

As shown in both FIG. 3 and FIGS. 4a and 4b, by electrically grounding the backside electrical contact 188 made of metal (such as copper and aluminium) or other conductive material (such as conductive ceramics), photogenerated charge (electrons) by the photo diode 186 of the photovoltaic device 180 is extracted by the top electrical contact grid 184 made of metal (such as copper and aluminium) or other conductive material (such as conductive ceramics) and then wired to and temporarily stored in the reservoir capacitor 72 of a voltage converter and battery charger 70. Besides collecting unused illumination by the reflective polarizing composite film 150 and converting to photogenerated charge, a side photovoltaic panel 50, perpendicularly facing the polarized illumination light 16, can be employed to collect not reflected but transmitting portion of the polarized illumination light 16 and deflected portion of spatially modulated light 27, to convert to photogenerated charge also conducted to the reservoir capacitor 72.

The optical surface 40, which deflects the polarized illumination light 16 from the integrated opto-electronic device 134 towards the reflective microdisplay imager 20 and let pass the spatially modulated light 27, can be also a concaved cylinder with its axis parallel to the common plane 24 of the reflective microdisplay imager 20, and its outer surface facing the incident polarized illumination light 16.

The voltage converter and battery charger 70 further comprises a voltage converter 74 and a battery interface 76. By monitoring voltage of accumulated photogenerated charge on the reservoir capacitor 72, the voltage converter 74 is turned on once voltage of the accumulated photogenerated charge is adequate. Moreover, the reservoir capacitor 72 supports full cycles of operation of the voltage converter 74 without allowing the input voltage of the voltage converter 74 in switching mode to drop below its operating voltage. When voltage of the reservoir capacitor 72 drops below a predetermined level (the minimum operating voltage of the voltage converter 74, or higher), the voltage converter 74 shuts down until the reservoir capacitor 72 again charges above the minimum operating voltage. The battery interface 76 is employed and connected with the rechargeable battery 80, to monitor the output voltage of the rechargeable battery 80 and to disable switching between the voltage converter 74 and the rechargeable battery 80 when the output voltage of the rechargeable battery 80 reaches a first limit and to enable the switching when the output voltage declines below a second limit. The reference IC application note by Maxim illustrates such a device and system of the voltage converter and battery charger 70 with the rechargeable battery 80.

By measuring accumulated photogenerated charge collected by the photovoltaic cell 180 of the integrated opto-electronic device 134 over defined time duration through the voltage converter and battery charger 70, light illumination generated by the light source 10 can be in situ monitored and adjusted real time according to a measurement result. Thus, intensity of the polarized illumination light 16, the incident polarized light 26 and the projection light 68 can be estimated and adjusted timely.

Typically, the energy storage device 80 is a rechargeable battery in lead acid or NiCd, as widely used in common portable and handheld systems. In practical application of the portable microdisplay projection system of the disclosed invention shown in FIGS. 4*a* and 4*b*, the same rechargeable battery 80 as a single energy storage device is employed to power one or both of the light source 10 and the reflective microdisplay imager 20, through the power management device 90. Also through the power management device 90, the rechargeable battery 80 could be regularly charged by an external electrical power source 95, also optionally providing electrical power to other electric-mechanical, electronic or optical devices affiliated with the disclosed portable microdisplay projection system, including the voltage converter and battery charger 70. This is applicable particularly as the disclosed portable microdisplay projection system is embedded into a handheld communication and computing device or a laptop computing device in which the number of device groups of the similar or same function is minimized. In modern integrated circuits, the power management device 90 could be readily integrated with the voltage converter and battery charger 70 into a single integrated circuit device.

Figure 5A:
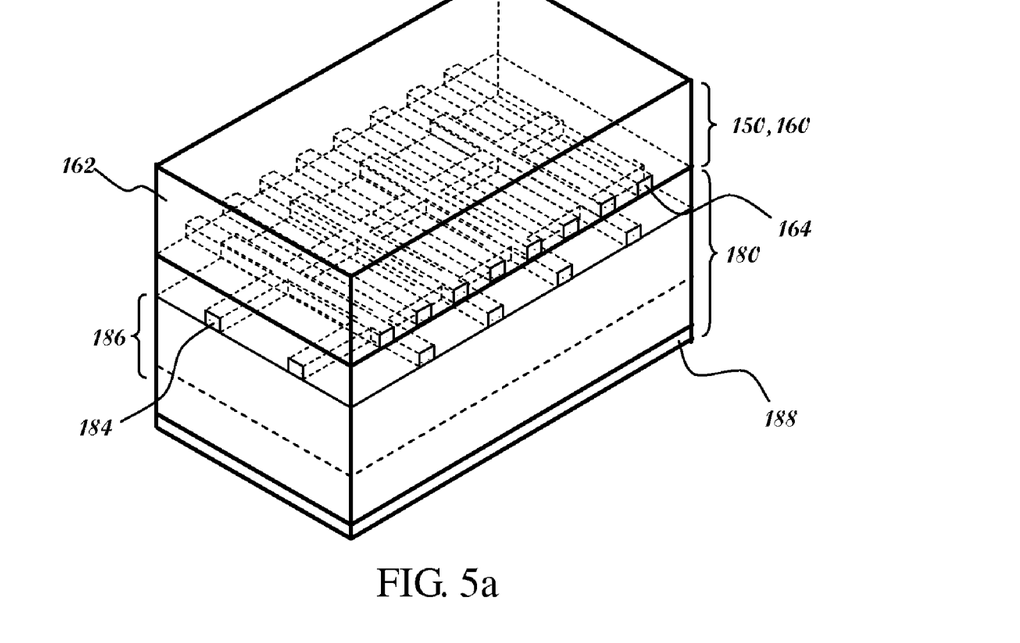
FIG. 5a is a perspective view showing another embodiment of the disclosed novel integrated opto-electronic device 134, in which the reflective polarizing composite film 150 comprises an micro-structured layer 160 of dielectric material 162 containing regularly spaced, parallel reflective conductive strips 164 in a plannar configuration.
Figure 5B:
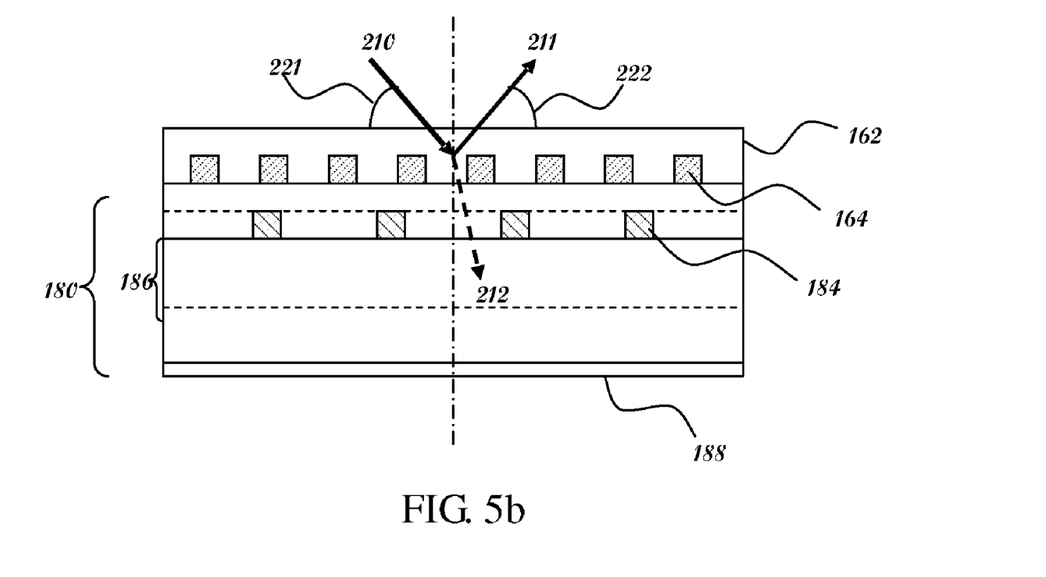

FIG. 5*a* is a perspective view showing another embodiment of the disclosed novel integrated opto-electronic device 134, in which the reflective polarizing composite film 150 comprises an micro-structured layer 160 of dielectric material 162 containing regularly spaced, parallel reflective conductive strips 164 made of metal (such as copper and aluminium) or other conductive material (such as conductive ceramics) in a plannar configuration; and FIG. 5*b* is a cross-section view of FIG. 5*a*. According to the desired non-normal incident angle 221 and reciprocal angle 222, the desired effective wavelength spectrum for visible light, preferably from 400 nm to 700 nm, and dielectric material 162 used as well as refractive index of the metal used, those reflective conductive strips 164 are spaced regularly in parallel at certain predefined fraction of the average wavelength spectrum, continuously covering the whole illumination area on the reflective polarizing composite film 150 by the source light 210.

Figure 6A:
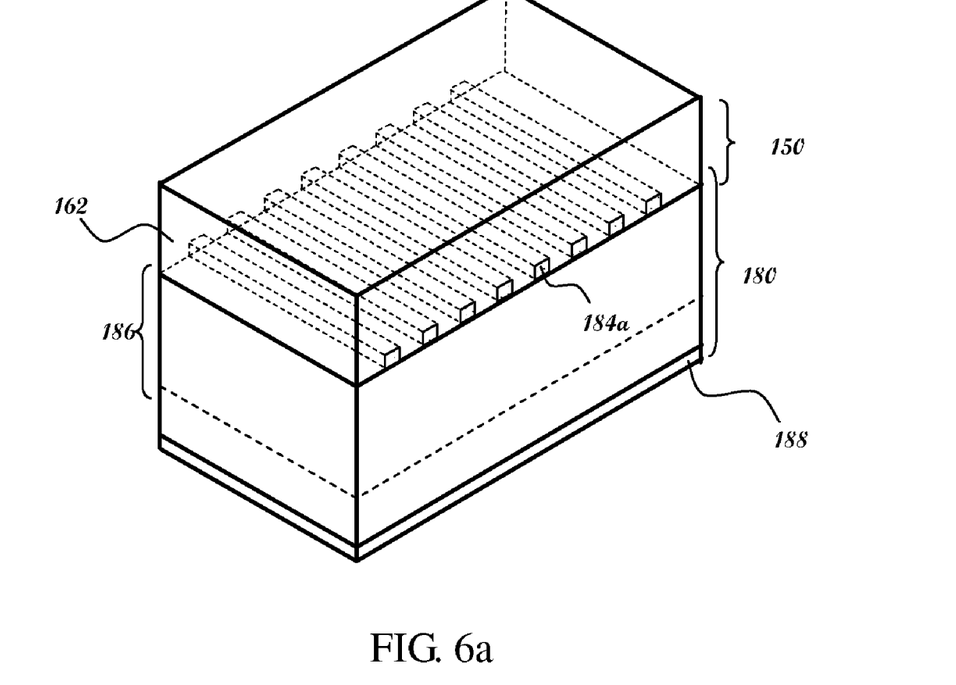
FIG. 6a is a perspective view showing another embodiment of the disclosed novel integrated opto-electronic device 134, where on a semiconductor substrate, a plurality of reflective top electrical contact lines 184a at the top of the photovoltaic cell 180, regularly spaced in parallel with a desired spacing and embedded in a dielectric material 162, reflect the P-component of incident light while deflect the S-component into photo diode, generating photogenerated charge.
Figure 6B:
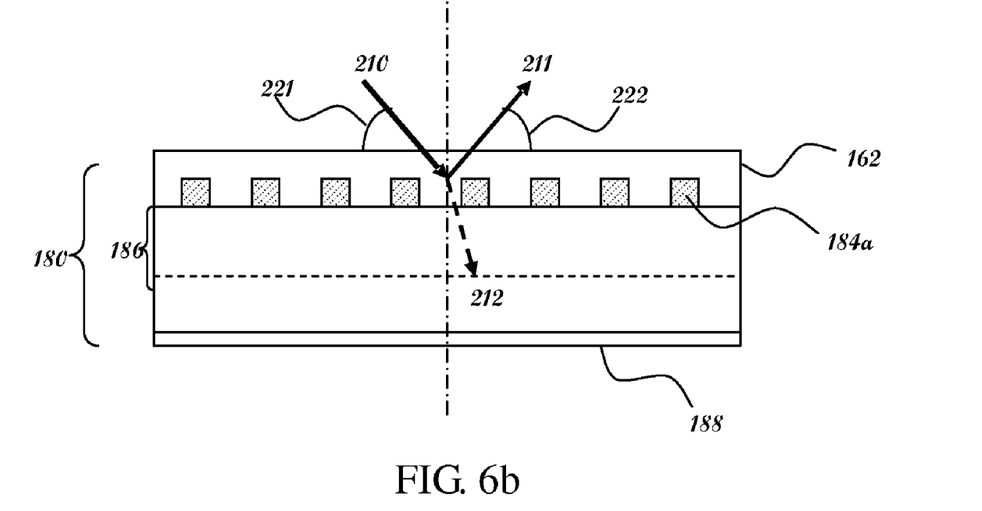
Figure 6C:
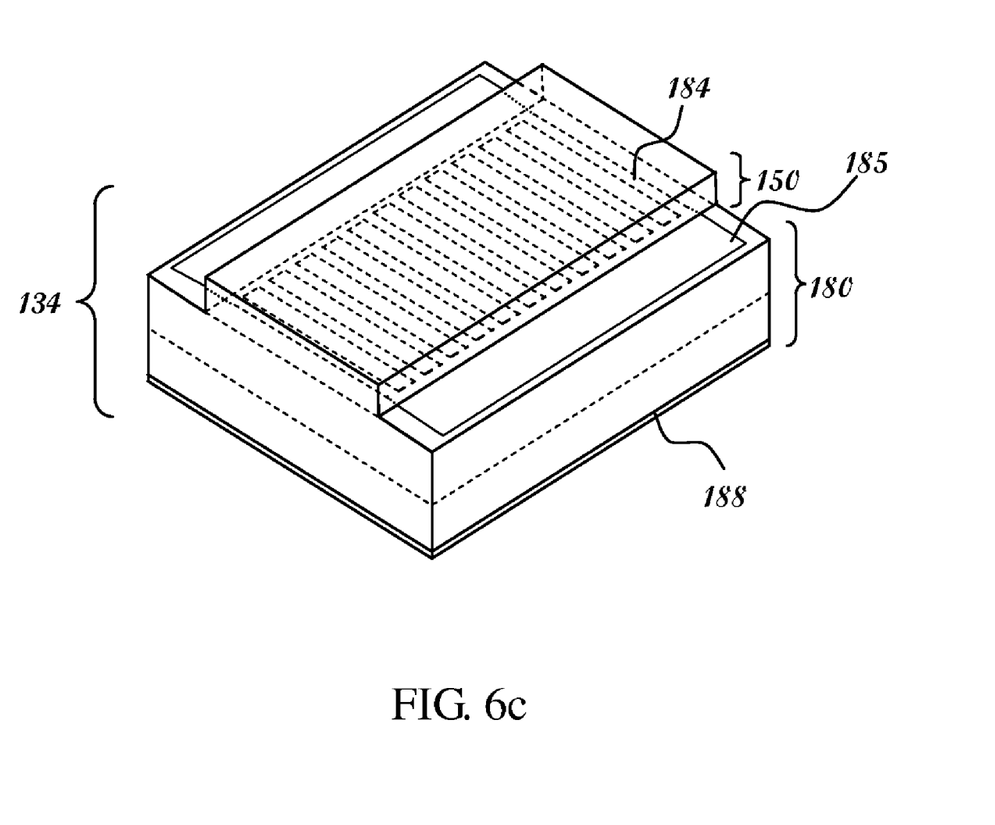
FIG. 6c shows a specific schematic of the reflective top electrical contact grid 184 in FIG. 6a and FIG. 6b.

FIG. 6*a* is a perspective view showing another embodiment of the disclosed novel integrated opto-electronic device 134, where on a semiconductor substrate, a plurality of reflective top electrical contact lines 184*a* at the top of the photovoltaic cell 180, regularly spaced in parallel with a desired spacing and embedded in a dielectric material 162, first portion 211 of the P-component of incident light (source light 210) while deflect the rest portion of P-component and all the second portion 212 into the photo diode 186, which generates photogenerated charge on a semiconductor substrate 190; and FIG. 6*b* is a cross-section view of FIG. 6*a*. This embodiment is a simplified hybrid plannar device which employs a plurality of reflective top electrical contact lines 184*a* on top of the photo diode 186 in a plannar configuration, as both electrical contact and wires for transporting photogenerated charge (electrons) and regularly spaced reflective conductive strips for reflecting majority of the first portion 211 of the P-component of incident light (source light 210) while deflecting the second portion 212 into the photo diode 186 to produce photogenerated charge. As they all transport photogenerated charge towards the edge of the integrated opto-electronic device 134, the reflective top electrical contact grid 184 are merged with either single or a plurality of metal pads 185, sized adequately for wiring with a ceramic or plastic circuit board or flex connected to the voltage converter and battery charger 70 as shown in FIG. 6*c*. The metal pads 185 sized in relatively large size are exposed, via photolithography and etching, at edges of the reflective polarizing composite film 150 where those reflective top electrical contact grid 184 end and merge with the metal pads 185.

An alternative configuration as additional embodiment of this invention employs a reflective polarizing composite film 150 which comprises a plurality of optical layers made of polymeric materials. Thus the integrated opto-electronic device 134 is assembled by seamlessly bonding the polymeric reflective polarizing composite film 150 to the photovoltaic cell 180 fabricated on a semiconductor substrate.

In summary, as shown in the drawing and hereinbefore described, the disclosed invention provides an innovative design opto-electronic architecture for designing a compact, electrically efficient of portable micro to pico projection systems using a reflective microdisplay imager based on spatial modulation of polarized illumination, by the means of partially energy-recovering, self-powering, and desirable arrangement for image formation and photovoltaic conversion of portion of unused light illumination, with help of a novel opto-electronic device, a voltage converter and battery charger and a built-in energy storage device. Such a novel opto-electronic device incorporates a reflective polarizing film onto a photovoltaic cell, readily fabricated on one semiconductor substrate. Although the provided description is for addressing primarily on a portable projection system employing a single LCOS imager, extended embodiments could be reasonably derived as applicable to other reflective microdisplay projection systems based on a number of reflective microdisplay imagers using spatial modulation of polarized illumination.

Although a specific embodiment of the disclosed invention has hereinbefore been described, the inventor will be appreciated by those skilled in the art that other embodiments may be conceived, without nevertheless departing from the scope of my invention as described in the appended claims. For example, the disclosed portable microdisplay projection system is readily applicable as the embedded projection display module into a handheld communication and computing or laptop computing device within which the rechargeable battery 80 sharing a single, main energy storage device also powers other electric-mechanical, electronic and optical devices. The integrated opto-electronic device according to the present invention can be applied to different types of portable reflective projection system, not limited to those described in the specification.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope and spirit of the present invention and covered in the claims of the present invention.

What is claimed is:

1. An integrated opto-electronic device used in a portable reflective projection system, comprising:
   a reflective polarizing composite film configured to receive a source light at a desired non-normal incident angle, polarize and reflect a first portion of said source light as polarized illumination light at a reciprocal angle to said desired non-normal incident angle; and
   a photovoltaic cell, adhered to an opposite side of said reflective polarizing composite film to said source light, configured to receive a second portion of said source light that passes through said reflective polarizing composite film and transform said second portion to photogenerated charge;
   both said reflective polarizing composite film and said photovoltaic cell are fabricated in an adherent stack on a semiconductor substrate, and said photovoltaic cell comprises:
   a plurality of reflective top electrical contact lines;
   a photon-to-electron converting photo diode; and
   a backside electrical contact;
   in a plannar configuration, wherein said plurality of reflective top electrical contact lines are regularly spaced in parallel in a plannar configuration with a constant desired spacing between each adjacent pair, placed in electrical contact to the top surface of said photo diode and covered by a plannar dielectric film, and said plurality of reflective top electrical contact lines are embedded into said reflective polarizing composite film.

2. The device according to claim 1, wherein both said reflective polarizing composite film and said photovoltaic cell are fabricated in an adherent stack on a semiconductor substrate, said photovoltaic cell comprises a top electrical contact grid, a photon-to-electron converting photo diode and a backside electrical contact in a plannar configuration.

3. The device according to claim 2, wherein said semiconductor substrate is made of single crystalline or polycrystalline silicon.

4. The device according to claim 2, wherein said reflective polarizing composite film comprises a single or a plurality of optical layer pairs made of a top layer and a bottom layer of dielectric material, in said optical layer pair, the top layer is configured to first receive said source light and has higher optical refractive index than the bottom layer, and both said top layer and bottom layer have optical extinctive coefficients below 0.1.

5. The device according to claim 2, wherein said reflective polarizing composite film comprises a single or a plurality of optical micro-structured layers of dielectric material incorporating reflective conductive strips of desired width and thickness, electrically isolated but spaced regularly in parallel straight lines in a plannar configuration.

6. The device according to claim 4, wherein said top layer and bottom layer of said optical layer pair, and dielectric material are made of one or any combination of silicon dioxide, silicon oxy-nitride, silicon nitride, aluminum oxide, hafnium oxide, tantalum oxide and titanium oxide.

7. The device according to claim 1, wherein said plannar dielectric film is made of one or any combination of silicon dioxide, silicon oxy-nitride, silicon nitride, aluminum oxide, hafnium oxide, tantalum oxide and titanium oxide.

8. The device according to claim 5, wherein said reflective conductive strips are made of one or any alloy of aluminum, aluminum-copper alloy, titanium and silver.

9. The device according to claim 1, wherein said reflective top electrical contact lines are made of one or any alloy of aluminum, aluminum-copper alloy, titanium and silver.

10. The device according to claim 1, wherein said reflective polarizing composite film comprises a plurality of optical layers made of polymeric materials and is bonded to said photovoltaic cell fabricated on a semiconductor substrate.

11. A portable reflective projection system comprising:
    an electrically powered light source configured to provide source light in a first direction;
    and integrated opto-electronic device comprising a reflective polarizing composite film configured to receive a source light at a desired non-normal incident angle, polarize and reflect a first portion of said source light as polarized illumination light at a reciprocal angle to said desired non-normal incident angle; and a photovoltaic cell, adhered to an opposite side of said reflective polarizing composite film to said source light, configured to receive a second portion of said source light that passes through said reflective polarizing composite film and transform said second portion to photogenerated charge;
    a reflective microdisplay imager comprising a plurality of reflective pixel elements which are arranged in a common plane, wherein said reflective pixel elements are configured to individually modulate reflectivity to incident polarized light and project spatially modulated light in a third direction perpendicular to said common plane;
    a lens having a principal plane parallel to said common plane and a principal axis aligned in said third direction;
    an optical surface positioned between said lens and said reflective microdisplay imager and further positioned in a tilted angle with said common plane configured to receive said polarized illumination light, so that portion of said polarized illumination light is deflected by said optical surface as said incident polarized light towards said reflective microdisplay imager, portion of said spatially modulated light passes through said optical surface as projection light partially passes through said lens in said third direction; a power management device;
    an energy storage device configured to provide electrical power to one or both of said light source and said reflective microdisplay imager through said power management device; and a voltage converter and battery charger configure to convert and charge said photogenerated charge transformed by said photovoltaic cell to said energy storage device.

12. The system according to claim 11, wherein said reflective pixel elements form a reflective light modulation array, each of the reflective pixel elements is electrically controlled in reflectance in the third direction by means of liquid crystal electrically driven by an underlying silicon integrated circuitry.

13. The system of claim 11, wherein said optical surface is in a concave cylindrical configuration facing said polarized illumination light from said integrated opto-electronic device.

14. The system according to claim 11, wherein said system further comprises a side photovoltaic panel perpendicular to said polarized illumination light and said second direction, opposite to said optical surface from said integrated opto-electronic device, configured to collect and transform portion of said polarized illumination light, passing through said optical surface, portion of said spatially modulated light deflected by said optical surface and portion of scattered light by transparent but light-scattering medium enclosed by said optical surface and said side photovoltaic panel to photogenerated charge, and electrically connected to said voltage converter and battery charger in parallel to said photovoltaic cell of said integrated opto-electronic device.

15. The system according to claim 11, wherein said voltage converter and battery charger is also powered by said energy storage device through said power management device.

16. The system according to claim 11, wherein said voltage converter and battery charger and said power management device is integrated in a single integrated circuit.

17. A method for in situ monitoring and adjusting light illumination from said light source in said portable reflective projection system of claim 11, comprising:

measuring accumulated photogenerated charge converted from said second portion of said source light collected by said photovoltaic cell over defined time duration of said integrated opto-electronic device; and in situ monitoring and adjusting said light illumination from said light source according to a measurement result.

18. An integrated opto-electronic device used in a portable reflective projection system, comprising:

a reflective polarizing composite film configured to receive a source light at a desired non-normal incident angle, polarize and reflect a first portion of said source light as polarized illumination light at a reciprocal angle to said desired non-normal incident angle; and a photovoltaic cell, adhered to an opposite side of said reflective polarizing composite film to said source light, configured to receive a second portion of said source light that passes through said reflective polarizing composite film and transform said second portion to photogenerated charge;

wherein both said reflective polarizing composite film and said photovoltaic cell are fabricated in an adherent stack on a semiconductor substrate, said photovoltaic cell comprises a top electrical contact grid, a photon-to-electron converting photo diode and a backside electrical contact in a plannar configuration; said reflective polarizing composite film comprises a single or a plurality of optical micro-structured layers of dielectric material incorporating reflective conductive strips of desired width and thickness, electrically isolated but spaced regularly in parallel straight lines in a plannar configuration.

19. The device according to claim 18, wherein said reflective conductive strips are made of one or any alloy of aluminum, aluminum-copper alloy, titanium and silver.

* * * * *